UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 266,143, dated October 17, 1882.

Application filed September 4, 1882. (No specimens.)

*To all whom it may concern:*

Be it known that I, JAMES HENDERSON, of Bellefonte, county of Centre, State of Pennsylvania, (formerly of New York,) have invented certain new and useful Improvements in the Manufacture of Compounds for Furnace-Linings and Fire-Brick, of which the following is a specification.

The object of my invention is to produce a compound for refractory furnace-linings and fire-brick, which shall be extremely infusible or capable of resisting very high and long-continued heats, and which may be applied and produced at a very small expense.

In carrying out this my invention I take curd of milk or lactic acid and mix it with hydrated lime, magnesian lime, or magnesia, or with silica or sand, or oxide of iron, with or without other substances. The curd of milk is mixed with either of the above-named substances in such proportions as will form a thick mortar. When used with lime, magnesian lime, or magnesia the curd is mixed with either of these substances to a thick mortar, and preferably molded into blocks and dried at the ordinary temperature, and afterward subjected in any suitable furnace to a temperature high enough to frit or harden it. Such furnace may be an open-hearth steel-melting furnace, and the block may be exposed therein at the highest temperature for from three (3) to six (6) hours, which treatment causes the lime or magnesian lime or magnesia, prepared as hereinbefore described, to frit and contract to the extreme limits of contraction and become very hard and firm. The lime, magnesian lime, or magnesia, after the treatment above described, is pulverized, preferably while still warm, sufficiently fine to pass through a sieve, preferably of about three thousand six hundred meshes to the square inch. To this compound of pulverized lime, magnesian lime, or magnesia I add a further quantity of lactic acid or curd of milk, in proportion to form a thick mortar, which is worked over until a thorough and intimate mixture is effected, when it is ready for use for the walls or linings of hearths of reverberatory furnaces, Bessemer converters, or other metallurgic vessels, when applied in the wet state and dried at the ordinary temperature; or it may be molded into brick, which are ready for use when dried at the ordinary temperature; or it may be baked in kilns in the usual manner; or, instead of using curd of milk to give the binding property to the previously fritted and pulverized compound, glucose and water, or other equivalent vegetable binding substance, in application filed on or about August 22, 1882, may be used, either with or without hydrated lime, magnesian lime, or magnesia, in admixture to give it the binding property.

The curd of milk or lactic acid may be employed with pure sand or silica or oxide of iron to give the binding property to form furnace-linings or fire-brick, or in combination with other substances, and is a substitute or equivalent for this purpose for glucose or vegetable binding substances, from which starch or sugar may be derived. In its application to sand or silica the sand is preferably washed and freed from loam, and is mixed with the curd to the consistency of thick mortar, preferably with about five (5) per cent. of hydrated lime, magnesian lime, or magnesia, or alumina, (which is preferably derived from fire-clay,) or ten (10) per cent. of oxide of iron, to give it the property of not contracting or expanding with changes of temperature. The silica or sand are used as free as possible from other substances which will form fusible compounds with the lime, magnesian lime, magnesia, oxide of iron, or alumina used in admixture, and all are preferably reduced to the fineness of flour or sea-sand and intimately mixed before the curd of milk or lactic acid is added, and the whole is worked over until a thorough and intimate mixture is effected, when it is ready for use for walls or linings of hearths of reverberatory furnaces, Bessemer converters, and other metallurgical vessels, when applied in the wet state and dried at the ordinary temperature; or it may be molded into brick, which are ready for use when dried at the ordinary temperature; or the bricks may be baked in the usual manner.

I do not wish to be understood as limiting myself to any of the proportions of silica, lime, alumina, magnesian lime, magnesia, or oxide of iron herein given, as others may be used, if preferred, and good results be obtained.

What I claim, and desire to secure by Letters Patent, is—

1. The process of manufacturing furnace-linings or fire-brick, consisting of mixing curd of milk or lactic acid with the refractory materials or compounds, as specified.

2. The process of manufacture of furnace-linings or fire-brick, consisting in subjecting lime, magnesian lime, or magnesia to sufficiently high temperatures to frit or harden it, and, secondly, to pulverize the fritted lime, magnesian lime, or magnesia and mix it with curd of milk or lactic acid, as specified.

JAMES HENDERSON.

Witnesses:
SCHUYLER DURYEE,
LEWIS THOMPSON.